Figure 1:
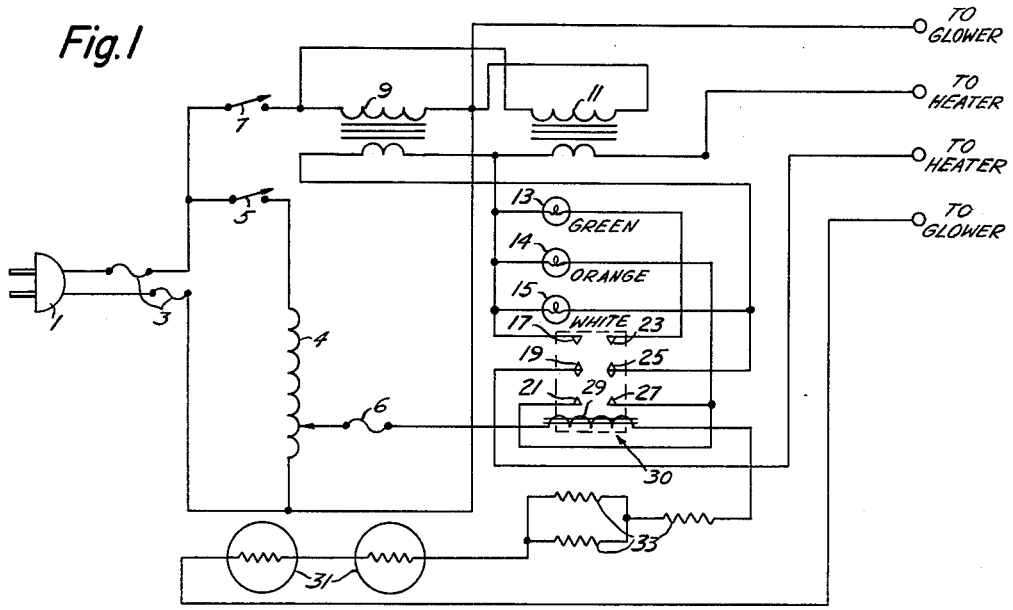

Aug. 24, 1965  H. R. CARLON  3,202,870
AUTOMATIC GLOWER SUPPLY
Filed Feb. 9, 1962  2 Sheets-Sheet 1

INVENTOR
Hugh R. Carlon

BY
ATTORNEY

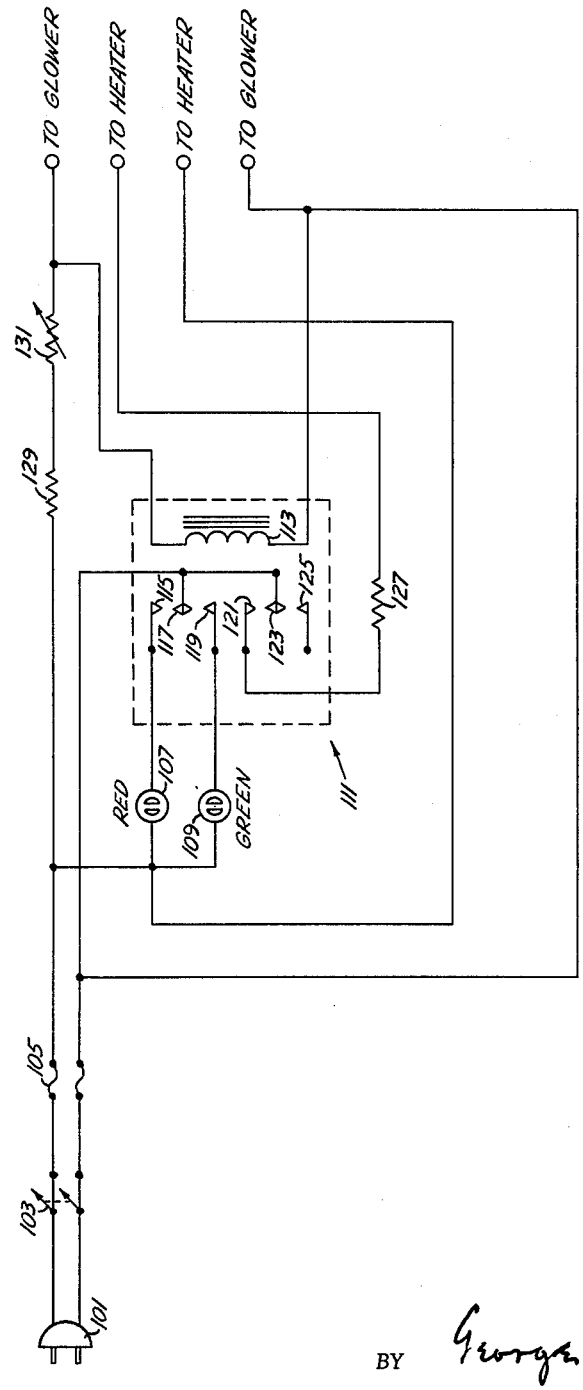

United States Patent Office 3,202,870
Patented Aug. 24, 1965

3,202,870
AUTOMATIC GLOWER SUPPLY
Hugh R. Carlon, Edgewood, Md., assignor to the United States of America as represented by the Secretary of the Army
Filed Feb. 9, 1962, Ser. No. 172,358
4 Claims. (Cl. 315—116)
(Granted under Title 35, U.S. Code (1952), sec. 266)

The invention described herein may be manufactured and used by or for the Government of the United States of America for governmental purposes without the payment to me of any royalty thereon.

This invention relates to a circuit used to heat a source of radiation for infrared instruments.

At the present time most infrared spectrometers use an infrared radiation source that is either a Globar (sintered silicon carbide) or a Nernst glower (zirconium oxide mixed with yttrium oxides).

The present invention is designed to be used with the Nernst glower since it has an extremely temperature-sensitive resistance. The Nernst glower, or glower as it is hereinafter designated, is usually heated to about 2000° K., which is the normal operating temperature by means of an electric heater manually controlled by the operator. The conventional heater or preheater usually consists of a spirally wound platinum or Nichrome wire mounted in close proximity to the glower. The patent to Hutchinson 2,876,361 discloses a heater circuit for a glower which uses a phototube receiving radiation from the glower which actuates a switch to turn the heater on or off in response to the glower output.

The present circuit is designed to free the operator from the responsibility of seeing that the glower is heated to the proper operating temperature since it does this task automatically in response to the current flow through the glower, without the need for a sensing element.

The principle upon which this device operates is simple and it depends upon the fact that the glower is a temperature-sensitive resistor, i.e. it has a negative temperature coefficient of resistance. Thus, when the glower is "cold" or at the temperature of its surroundings, its resistance is in the order of megohms. On the other hand, when the glower is heated to about 2000° K., the resistance of it drops to the order of tens of ohms. I have found that by placing current or voltage sensitive relay in circuit with the glower I can control the electric current to the heater associated with the glower until it is approximately at its normal operating temperature, then the relay will automatically switch the electric heater current off.

If the glower should be suddenly cooled by blast of air, power failure, power fluctuation, or circuit failure, the heating circuit again is actuated by the relay to restore the glower to its normal operating temperature. In the event of glower failure, the heater itself provides some infrared radiation for continued emergency use of the detector in the field.

While the disclosed circuit is of value in use with commercial spectrometers, it finds its greatest use in the long path infrared detection of atmosphere contaminants. In Patent 2,930,893, issued to Carpenter et al., there is described a method of detecting nerve gases such as sarin or GB by sending a continuous beam of infrared radiation from the source through the atmosphere for a distance of fifty yards or more to the detector. In a tactical situation, this device is set up to monitor the area between the enemy and our own troops to detect the use of nerve gases before we have any casualties. This necessitates someone going into the forward area to set up the equipment and remain in the area to insure proper operating conditions. With my device, all the operator has to do is set up the equipment and throw the starter switch. From then on the infrared radiation source is brought to operating temperature and maintained there automatically without the need for anyone exposing himself to enemy fire again. As will be seen later, the circuit is designed to operate from batteries or normal alternating current sources. When the infrared detector is used to protect a storage depot, manufacturing facilities, or other vital military areas, alternating current can be used since it is readily available.

In the drawing, FIG. 1 represents a circuit using only 110 volt A.C. current.

Figure 2:
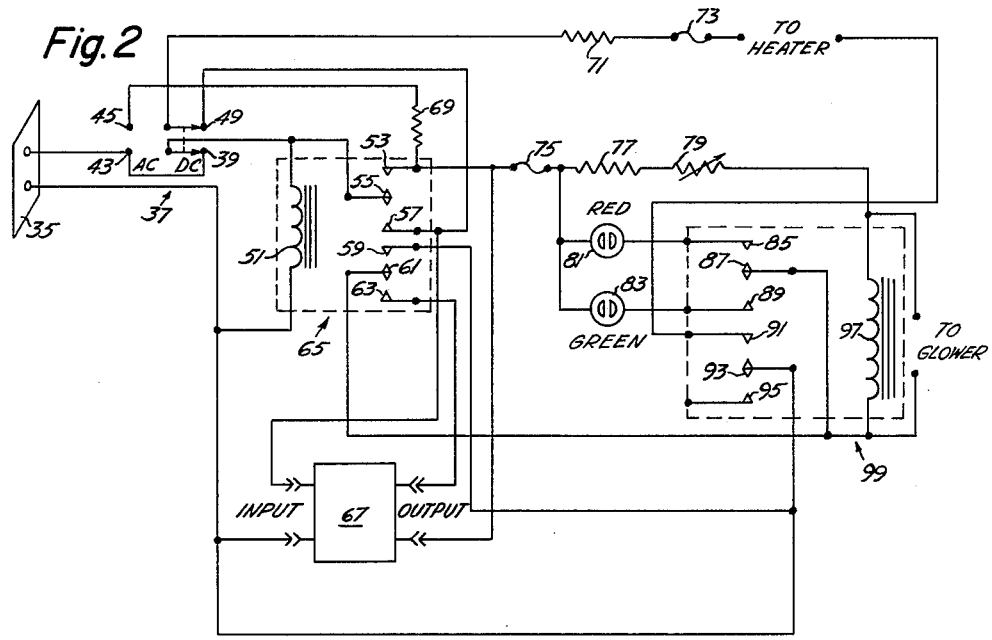

FIG. 2 represents the circuit using either 12 volt batteries or 110 volt A.C. current.

In FIG. 1, the number 1 indicates a conventional wall plug. Two line fuses are indicated by 3. An on-off switch is shown by 5, which may or may not be ganged to a second on-off switch 7. Two filament transformers 9 and 11 provide a relatively high current for the heater which is not illustrated since it is a conventional heating element as is pointed out above.

The indicating incandescent lights 13, 14 and 15 are connected to the contacts 23, 27, 27 and 25 of the relay generally shown at 30 in such a way that they give a visual indication of the operation of circuit. The number and color of the lamps is of course optional. In the present instance, the white light is used to indicate that the automatic glower supply is on and that the power line and fuses are operating properly; the orange light is used to indicate that the heater is operating and the glower is preheating or extinguished and reheating; the green lamp is used to indicate the glower is operating with the heater off and that the source fuse and ballast tubes are satisfactory.

The variable voltage tap 4, the source fuse 6, and resistors 33, control the amount of current going to the glower while the ballast tubes 31 control the fluctuations in the current supply.

In the operation of the circuit of FIG. 1 the supply current flows through the coil 29 of the relay 30, through the resistors 33 and ballast tubes 31 to the glower and back to the plug 1. During the initial starting the glower has a high resistance and relatively little current flows through the above circuit. At this point, contacts 19 and 25 are closed, i.e., contacting 21 and 27 respectively so that the heater current induced in the secondaries of transformers 9 and 11 flows through the contacts 25 and 27 and the contacts 19 and 21 to the heater and back.

When the heater has brought the glower to its proper operating temperature, the current through coil 29 increases to a point at which time the relay is pulled in and the normally open contacts 17 and 23 are now closed. This turns off the heater current until it is again needed as indicated by the current through the coil 29.

In FIG. 2, there is double pole center-off double throw switch generally shown at 37 with four contacts 39, 43, 45 and 49. This switch is in series with the plug 35 so that if the power source is low voltage direct current, the switch is thrown to the right as illustrated. If the glower supply is moved to an area where alternating current is supplied, switch 37 can be thrown to the left to activate that part of the circuit which is designed to handle alternating current.

Considering now the situation in which direct current is used such as that coming from 12 volt battery, it will be seen that current will flow from the lower prong of plug 35 to the converter 67 and back to the contact 57 of the first relay generally shown at 65. Since this relay is normally closed with contacts 55 and 57 adjacent each other, the direct current flows back to the other side of the line through contacts 39 and 43 of switch 37.

When the converter 67 is activated, alternating current flows through fuse 75, resistors 77 and 79 to the glower and the coil 97 of the second relay generally shows at 99. This current then flows through contacts 61 and 63 of the first relay 65 and back to the converter. This flow of alternating current through the glower when it is relatively cold (high in resistance) impresses a high voltage across the coil 97 and relay 99 is pulled in. This results in the closing of contacts 93, 91 and 87, 85 and a direct current is sent through the heater and back to the other side of the line through switch contact 49 and contacts 57 and 55 of relay 65. When the glower becomes operative, the high voltage across coil 97 drops and the relay returns to normal. This opens the contact between 91 and 93 and the current to the heater is turned off. Upon failure of the glower supply for one reason or another it will cool down and the voltage across it will build up to a predetermined point at which the relay 99 will again actuate the heater.

If the source of electrical energy is an alternating current source (110 volts) contacts 43 and 45 of switch 37 can be manually closed so that alternating current will flow through coil 51 of the first relay 65. This will pull the relay in and close contacts 53 and 55 as well as contacts 61 and 59. Thus, the alternating current flows through contacts 53 and 55 to the heater (through switch 37) and to the glower and the second relay 99. It will be seen that the first relay cuts the converter out of the circuit when the source is an alternating current. The operation of the second relay 99 is the same with an alternating current source as it is with a direct current source. Thus, the glower is heated by an alternating current regardless of whether the source is alternating or direct current.

In FIG. 3, the operation is as follows: the alternating current flows in from the wall plug 101 to the glower. This puts a voltage across the coil 113 of the voltage sensitive relay 111 due to the high resistance of the glower and relay coil at room or ambient temperature. This action pulls the relay contacts 115 and 117 together and also contacts 121 and 123 come together. This switches the heater on through its dropping resistors 127 and turns on the red neon pilot light 107 to indicate that the glower is in the process of being warmed up.

As soon as the glower is operative, the voltage across it drops to a relatively low value and the relay contacts are released. Thus, the heater is switched off when contacts 117 and 119 as well as contacts 123 and 125 come together. This turns on the green pilot light 109 to indicate the glower is operative and ready for use.

The above operation insures long life for the equipment since during normal operation of the glower the current through the coil 113 is at a minimum and the coil is therefore not heated up unduly. Likewise, a relatively heavy current flows through contacts 115, 117 and 121; 123 only when the heater is on so that these contacts have a long life in practice.

In the circuits shown in the drawing it is to be understood that the dropping resistors 31, 33, 71, 77, 79, 129, 131, 127 can be replaced with an equivalent impedance derived from a suitable coil or condenser so that the loss of energy due to heat in the resistances will be almost entirely eliminated. This insured a long battery life when operating according to FIG. 2.

It is to be understood that the present schematic drawings are presented to illustrate the principle involved in this invention and are not to be taken as a limitation of the invention. The use of any or all of the pilot lights is entirely optional and may be eliminated where economy is a prime consideration.

I claim:
1. In a device for starting and maintaining a glower at its operating temperature, the combination comprising:
   (a) a glower,
   (b) a source of electrical energy connected to said glower,
   (c) an electric heater located in thermal proximity to and electrically parallel to said glower,
   (d) a voltage sensitive relay in parallel to said glower controlling a switch therein serially connected to said heater whereby said heater is turned on when said glower is cold and said heater is turned off when said glower is at its operating temperature.

2. A device for starting and maintaining a glower at its operating temperature, the combination comprising:
   (a) glower means,
   (b) a source of electrical energy connected to said glower,
   (c) electric heater means located in thermal proximity to and electrically parallel to said glower,
   (d) voltage sensitive relay means in parallel to said glower means and having control switch means therein serially connected to said heater means whereby said heater means is turned on when said glower means is cold and said heater means is turned off when said glower means is hot.

3. In a device for starting and maintaining glower means at its operating temperature having a source of electrical energy, glower means, and electric heater means for said glower means, the improvement which comprises placing voltage sensitive relay means having control switch means therein parallel to said glower means and placing said control switch means in series with said electric heater means whereby electrical energy is directed to said heater means only when said glower means is below a predetermined temperature.

4. In a device for starting and maintaining a glower at its operating temperature having a source of electrical energy, a glower, and an electric heater for said glower, the improvement which comprises placing a voltage sensitive relay having a control switch therein in parallel to said glower and placing said control switch in series with said electric heater whereby electrical energy is directed to said heater only when said glower is below a predetermined temperature.

References Cited by the Examiner
UNITED STATES PATENTS

| | | | |
|---|---|---|---|
| 665,664 | 1/01 | Raab | 315—116 X |
| 673,935 | 5/01 | Wurts | 315—116 |
| 716,889 | 12/02 | Hanks | 315—116 X |
| 1,548,943 | 8/25 | Green | 307—72 |

DAVID J. GALVIN, *Primary Examiner.*
BENNETT G. MILLER, *Examiner.*